(No Model.)

W. C. McINTIRE.
HANDLE FOR COFFEE POTS OR SIMILAR VESSELS.

No. 420,917. Patented Feb. 4, 1890.

WITNESSES:
Edwin L. Bradford
E. Everett Ellis

Wm. C. McIntire INVENTOR

UNITED STATES PATENT OFFICE.

WILLIAM CRANCH McINTIRE, OF WASHINGTON, DISTRICT OF COLUMBIA, ASSIGNOR TO THE IRON CLAD MANUFACTURING COMPANY, OF NEW YORK, N. Y.

HANDLE FOR COFFEE-POTS OR SIMILAR VESSELS.

SPECIFICATION forming part of Letters Patent No. 420,917, dated February 4, 1890.

Application filed December 2, 1889. Serial No. 332,241. (No model.)

*To all whom it may concern:*

Be it known that I, WILLIAM CRANCH MC-INTIRE, a citizen of the United States, residing at Washington, in the District of Columbia, have invented certain new and useful Improvements in Handles for Coffee-Pots or Similar Vessels; and I do hereby declare the following to be a full, clear, and exact description of the invention, such as will enable others skilled in the art to which it appertains to make and use the same.

My invention relates to certain new and useful improvements in detachable handles for coffee-pots and similar vessels.

In the manufacture of coffee-pots, tea-pots, pitchers, or like vessels which are designed to be furnished with a handle, it is desirable that the handle should be made separate from the body of the vessel, and so constructed that it may be readily attached to and detached from the same, and this is especially desirable in that class of goods known as "enamel ware," in order that the vessel with the handle-securing rivets may be enameled, so as to avoid the possibilities of leaks or faulty joints, which cannot be successfully or economically done when the handle is previously attached; and in this class of goods it has been found very difficult to permanently attach handles after the vessel has been enameled without marring or destroying the enamel coating.

The object of my invention is to provide a handle made separate from the vessel, and which may be readily secured in place by the retail dealer or user without the employment of skilled labor or special tools, and at a minimum cost; and with these ends in view my invention consists of an ordinary cast or sheet metal handle made in two parts longitudinally and secured together by rivets at any desired locality and adapted to be secured in proper relation to the vessel by T-headed rivets and T-shaped slots, and locked in such position by a simple locking-plate, as will be hereinafter fully set forth.

In order that those skilled in the art to which my inventiom appertains may know how to make and use the same, I will proceed to describe the construction of my improved handle and the manner of applying the same, referring by letters to the accompanying drawings, in which—

Figure 1:
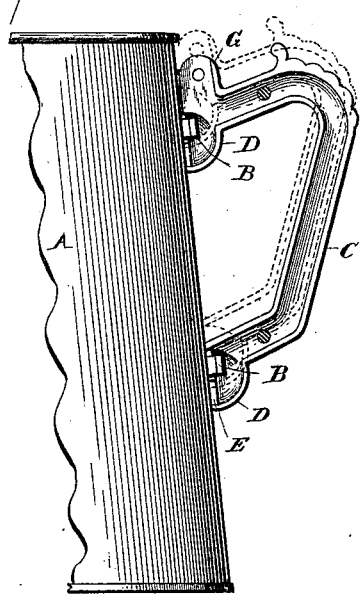
Figure 2:
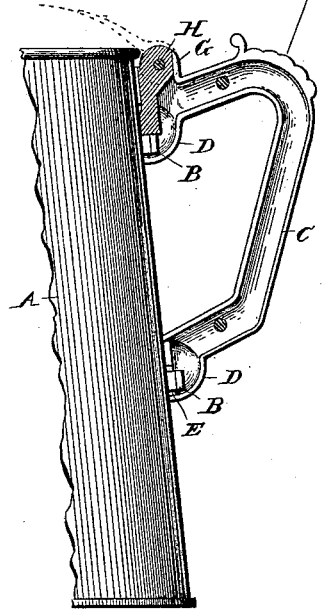
Figure 3:
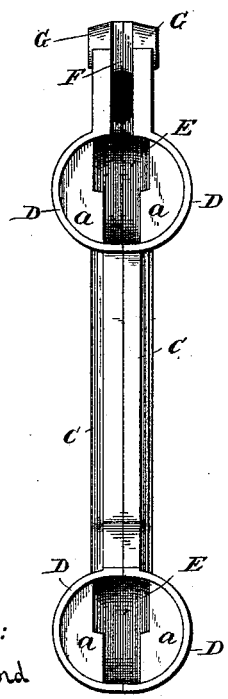
Figure 4:
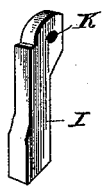

Figure 1 is a side elevation of an ordinary enamel coffee-pot with my improved handle shown in its lowest position in the act of applying the same, one longitudinal half of the handle being removed to expose the interior, and the dotted lines showing the handle in its elevated or permanent position. Fig. 2 is a similar side elevation with one-half of the handle removed, the handle being shown in its raised or permanent position and the locking device in section. Fig. 3 is a front elevation, on enlarged scale, of my improved handle without the locking device; and Fig. 4 is a perspective view of the locking device.

Similar letters of reference denote like parts in the several views.

A is an ordinary coffee-pot, pitcher, or other analogous vessel, provided at the rear portion of the cylinder with two T-headed rivets B, which are preferably secured in place before the vessel is enameled, in order that all joints may be thoroughly coated and sealed by the enamel.

The handle is preferably composed of two longitudinal halves C C, of any desired configuration, and they may be composed of cast or sheet metal or other suitable material. Each half of the handle is formed with a boss D at the bottom and with a similar boss D near the top, the distance between such bosses being regulated by the distance between the T-headed rivets B. Each boss is formed with a web $a$, of such form that when the two parts of the handle are properly secured or riveted together there will be formed a T-shaped slot or recess E, the larger portion adapted to pass over the head of the rivet B and the contracted portion to slide upon the shank of the rivet and locked behind the head thereof. The bosses D are of course hollow to admit the rivets B.

The upper ends of the handle project slightly above the upper boss, leaving a channel or space F between the parts, and the extreme ends of these projected portions of the two parts of the handle are fashioned into a lug G, with a small hole centrally of the same to receive a hinge-pintle H.

The channel or space F is so proportioned as to receive by a neat fit a locking device I, (shown fully at Fig. 4,) which consists of a piece of metal preferably about one-eighth of an inch thick, which may be cast in the form shown, though I prefer to make the same by stamping the same under a drop-press. This locking device is formed at its upper end to correspond with the lug G, and is provided with a hole K to receive the pintle of an ordinary bifurcated hinge, which may be employed to secure a cover or lid to the vessel. The length of the locking device is so regulated that when the handle is in the position shown at Fig. 2 and by dotted lines at Fig. 1 the length of the locking device from the center of the hole K to the extreme lower end will be equal to the distance from the center of the pintle-holes in the handle to the upper plane of the T-headed rivet near the top of the vessel, and to provide for any slight inequalities resulting in manufacture the lower face or edge of the locking device I is slightly beveled from the rear toward the front edge, so that when the locking device is placed in the channel F the pintle-hole K will be slightly eccentric to the pintle-holes in the handle, in order that the passage of the pintle will slightly force down the locking device and draw all the parts tightly together.

In applying my improved handle to a coffee-pot the enlarged portions of the slots E are passed over the T-head of the rivets B, as clearly shown in solid lines at Fig. 1. The handle is then raised bodily to the position shown in dotted lines at Fig. 1 and in solid lines at Fig. 2, by which movement the narrow or contracted portions of the slots E embrace the shank of the rivets, and are located behind the heads thereof, or, in other words, lie between the heads of the rivets and the wall of the cylinder, thus holding the handle and cylinder in proper and close relation. After the handle has been thus adjusted the locking device I is dropped into the channel or space F, as clearly shown at Fig. 2, and the hinge-pintle H being placed in position, the handle is prevented from moving downward and the several parts are securely locked together.

When no cover is used, the pintle H simply becomes an ordinary rivet, and it may be headed in place, or it may be made in the form of a screw; but in either case it may be desirable to slightly taper the body of the pintle, in order that it may the more readily enter the hole K and serve to force the device I downward. In applying a cover I prefer to use the ordinary and well-known bifurcated metallic hinge; but it is of course apparent that any other suitable hinge may be employed.

Another application filed by me concurrently with this, and bearing Serial No. 332,240, shows and describes another form of device for accomplishing the same results sought by this application; and I do not therefore wish to have my present invention confounded with that described in the other application for Letters Patent.

What I herein claim as new, and desire to secure by Letters Patent, is—

1. The handle C, formed with the hollow bosses D, slots E, lug G, and having an unobstructed channel F, substantially as set forth.

2. The combination of a coffee-pot A, provided with T-headed rivets B, and a handle C, adapted to be secured in position over and upon the rivets B, and provided with a channel F, a locking-plate I, resting upon the upper rivet B, and secured in position by a rivet or pintle H, as and for the purpose set forth.

3. The locking device I, provided with a pintle-hole K and adapted to be secured in place, as and for the purpose set forth.

In testimony whereof I affix my signature in presence of two witnesses.

WM. CRANCH McINTIRE.

Witnesses:
   D. G. STUART,
   D. P. COWL.